United States Patent [19]
Hjaltason

[11] Patent Number: 5,829,177
[45] Date of Patent: Nov. 3, 1998

[54] ILLUMINATED SIGN AND SIGN PLATE THEREFOR

[75] Inventor: Thorgeir Daniel Hjaltason, Reykjavik, Iceland

[73] Assignee: Leonardo Investments Ltd., Isle of Man

[21] Appl. No.: 706,626

[22] Filed: Sep. 6, 1996

[51] Int. Cl.⁶ .................................................. G09F 13/18
[52] U.S. Cl. ................................ 40/546; 40/542; 362/812
[58] Field of Search ........................... 40/427, 542, 546, 40/547, 582, 615; 362/31, 812

[56] References Cited

U.S. PATENT DOCUMENTS

| | | |
|---|---|---|
| 478,204 | 7/1892 | McGimsey . |
| 1,725,206 | 8/1929 | Petersen . |
| 1,786,155 | 12/1930 | Farrell . |
| 1,805,798 | 5/1931 | Bedrossyan . |
| 1,887,523 | 11/1932 | Schenkel . |
| 1,975,690 | 10/1934 | Harrington et al. . |
| 2,071,239 | 2/1937 | Spencer et al. . |
| 2,107,860 | 2/1938 | Gilbert . |
| 2,213,868 | 9/1940 | Lucian . |
| 2,262,930 | 11/1941 | Gasper . |
| 2,374,323 | 4/1945 | Bihr . |
| 2,594,903 | 4/1952 | Freedman et al. . |
| 2,689,917 | 9/1954 | Switzer . |
| 2,707,346 | 5/1955 | Fuller, Jr. . |
| 2,810,225 | 10/1957 | Hardesty . |
| 2,886,911 | 5/1959 | Hardesty ........................ 40/546 |
| 3,131,670 | 5/1964 | Hardesty ..................... 40/546 X |
| 3,270,201 | 8/1966 | Hardesty . |
| 3,583,298 | 6/1971 | Van Swearingen . |
| 3,771,245 | 11/1973 | Mabrey et al. . |
| 3,978,599 | 9/1976 | Berger . |
| 4,106,859 | 8/1978 | Doriguzzi et al. . |
| 4,424,449 | 1/1984 | O'Brill . |
| 4,507,888 | 4/1985 | Robinson et al. . |
| 4,583,766 | 4/1986 | Wessel . |
| 4,891,896 | 1/1990 | Boren . |
| 5,009,019 | 4/1991 | Erlendsson et al. . |
| 5,273,796 | 12/1993 | Elbing et al. ................. 40/615 X |
| 5,414,947 | 5/1995 | Hjaltason . |

FOREIGN PATENT DOCUMENTS

| | | |
|---|---|---|
| 3715127 | 9/1988 | Germany ........................ 40/427 |
| 496482 | 11/1938 | United Kingdom . |

Primary Examiner—Brian K. Green
Attorney, Agent, or Firm—Brinks Hofer Gilson & Lione

[57] ABSTRACT

A sign plate for an edge-iluminated sign including a transparent sheet with a front face, a rear face and a transparent edge that connects the front face to the rear face, wherein the transparent edge is positioned to receive light from a light source for transmission along the transparent sheet. The sign plate further includes a front image layer disposed on a front face of the transparent sheet, wherein the front image layer has a reflective surface. A rear image layer is disposed on a rear face of the transparent sheet substantially in registry with the front image layer, wherein the front image layer and the rear image layer are positioned so that the light within the transparent sheet is reflected from the reflective surface onto the rear image layer thereby to enhance illumination of the rear image layer. The sign plate has a structure such that a portion of the light within the transparent sheet forms an image of a halo or aura of light surrounding of the rear image layer.

28 Claims, 3 Drawing Sheets

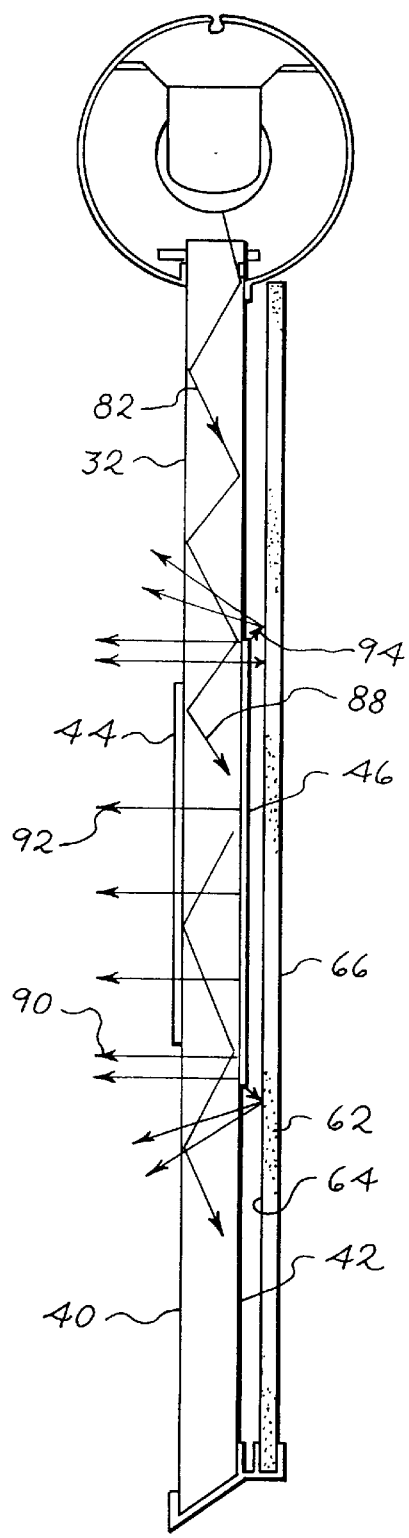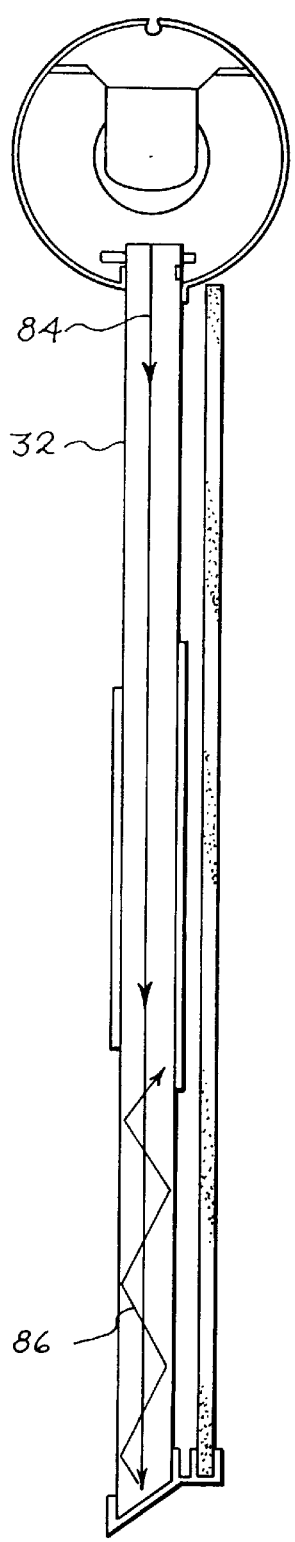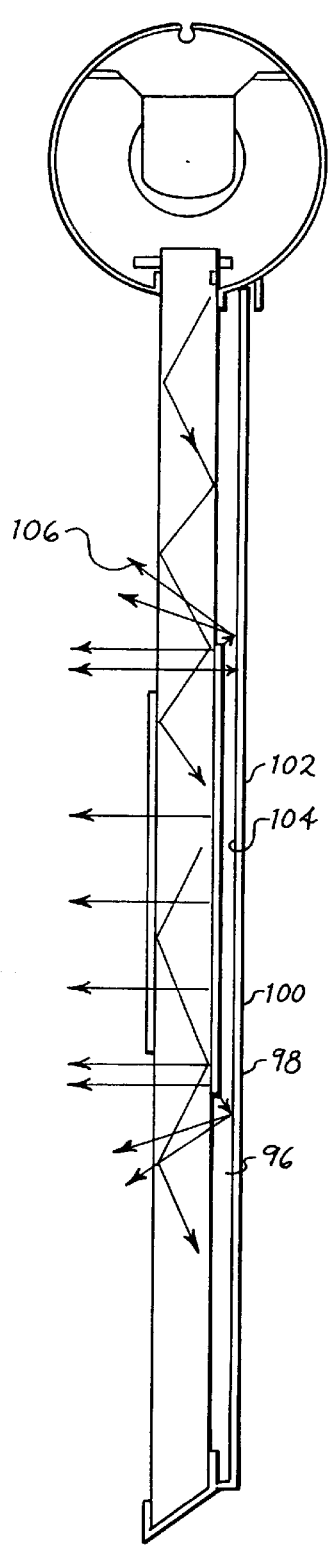

ILLUMINATED SIGN AND SIGN PLATE THEREFOR

Applicant claims, under 35 U.S.C. § 119, the benefit of priority of the filing date of Sep. 8, 1995, of United Kingdom Application No. 9518397.6, filed on the aforementioned date, the entire contents of which are incorporated herein by reference.

BACKGROUND OF THE INVENTION

1. Field of the Invention

The present invention relates to an illuminated sign and to a sign plate for an illuminated sign.

2. Description of the Related Art

Edge-illuminated signs are known in which a transparent plastics sheet is illuminated by a light source disposed along one edge thereof so that light passes through the sheet material in a direction along the plane of the sheet. An image to be displayed is formed on one of the faces of the sheet whereby the light contrast between the image and the remainder of the sheet increases the visual impact of the image to a person viewing the sign. A typical known edge-illuminated sign is illustrated in FIG. 1.

Referring to FIG. 1, a transparent plastic sheet 2, typically of acrylic plastic material, which is rectangular in shape has one edge 4 thereof received in a lamp housing 6 in which an elongate bulb 7, typically a fluorescent bulb, and electrical fittings 9 therefor are received, the bulb extending substantially along the length of the edge 4. In use, an end cap 8 is fitted over each end 10 of the lamp housing 6. In FIG. 1, which is a partially exploded view, one end cap 8 is shown in its removed configuration and the bulb and electrical fittings 9 are partially removed so that the edge 4 of the sheet 2 is readily visible. The sheet 2 is provided either on its frontmost face 12 or its rearmost face 14, the direction being with respect to the intended position of a viewer of the sign, with an image 16. The image 16 may be formed by engraving the surface of the sheet 2 or by printing a partially transmissive printed ink layer on the surface of the sheet, for example by screen printing. When the bulb 7 is illuminated, light emitted from the bulb 7 passes along the sheet 2 from the edge 4 and is internally reflected at the sheet/air interfaces. When the image 16 is a engraved, light passing along the sheet 2 is reflected and refracted at the engraved edges thereby illuminating the edge of the image 16. When the image 16 is printed, the internally reflected light is incident on the rear surface of the image 16 and is partially transmitted to the front surface of the image 16 thereby to provide an illuminated image.

When the image is engraved this increases the cost and complexity of manufacture of the illuminated sign. When the image is printed, the degree of contrast of the image is not particularly high and so the sign is not particularly effective in ambient conditions of high light intensity. Furthermore, for both prior arrangements the nature of the images which can be conveyed by the signs is relatively limited.

U.S. Pat. No. 5,009,019 and WO-A-93/07605 are both in the name of the present inventor and relate to sign plates for illuminated signs. Both of these prior specifications disclose a sign plate for an illuminated sign which is intended to be illuminated by a light source disposed behind a rearmost face of the sign plate.

An aim of the present invention is to provide an improved edge-illuminated sign. It is a further aim of the present invention to provide an edge-illuminated sign which can be manufactured cost-effectively and can provide enhanced illumination of the image as compared to known edge-illuminated signs. It is a further aim of the present invention to provide an edge-illuminated sign which enables a wide variety of images to be displayed.

SUMMARY OF THE INVENTION

Accordingly, the present invention provides an illuminated sign comprising a light source, a transparent sheet having one edge thereof which one edge is assembled adjacent the light source for receiving light therefrom which, in use, is transmitted along the transparent sheet, a front image layer which is disposed on a front face of the transparent sheet and has a rearwardly-directed reflective surface and a rear image layer which is disposed on a rear face of the transparent sheet substantially in registry with the front image layer whereby, in use, light is reflected from the reflective surface onto the rear image layer thereby to enhance the illumination of the rear image layer.

The present invention further provides a sign plate for an edge-illuminated sign, the sign plate comprising a transparent sheet having one transparent edge thereof for receiving from a light source light for transmission along the transparent sheet, a front image layer which is disposed on a front face of the transparent sheet and has a rearwardly-directed reflective surface and a rear image layer which is disposed on a rear face of the transparent sheet substantially in registry with the front image layer whereby, in use, light is reflected from the reflective surface onto the rear image layer thereby to enhance the illumination of the rear image layer.

BRIEF DESCRIPTION OF THE DRAWINGS

Embodiments of the present invention will now be described by way of example only, with reference to the accompanying drawings, in which:

FIGS. 4 & 5 are schematic views similar to that of FIG. 3 illustrating the mechanism of the transmission of light along and out of the transparent plastic sheet of the sign illustrated in FIG. 2; and FIG. 6 is a cross-section through an edge-illuminated sign in accordance with a second embodiment of the present invention.

DESCRIPTION OF THE PREFERRED EMBODIMENT(S)

Figures 2, 3:
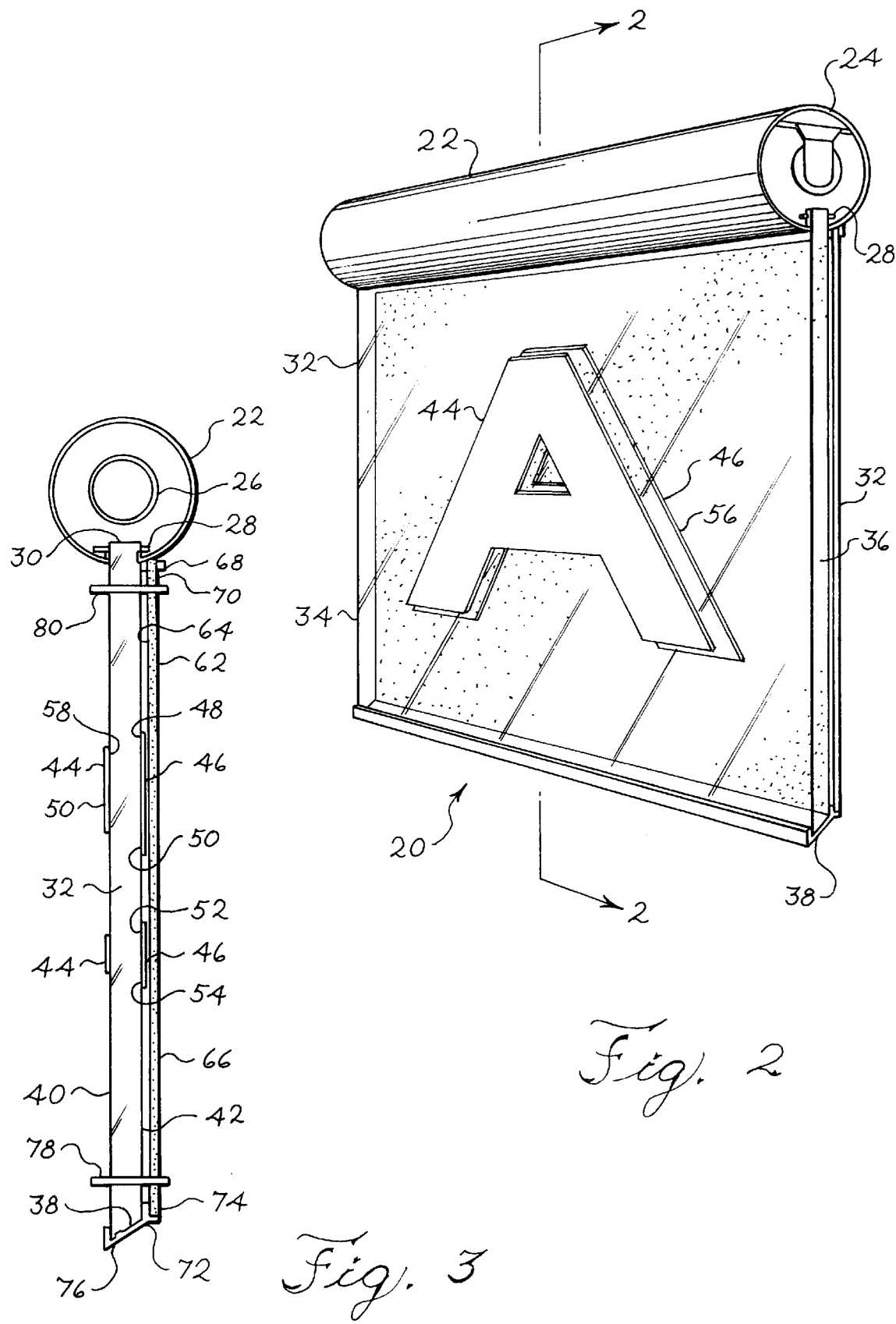
FIG. 2 is a perspective view of an edge-illuminated sign in accordance with a first embodiment of the present invention.
FIG. 3 is a cross-section on line A—A of the edge-illuminated sign illustrated in FIG. 2.

Referring to FIGS. 2 and 3, there is shown an edge-illuminated sign, designated generally as 20, in accordance with a first embodiment of the present invention. The sign 20 comprises a lamp housing 22 in the form of a cylindrical tube. At opposed ends of the lamp housing 22 are provided electrical fittings 24 for a fluorescent bulb 26 which extends along the length of the lamp housing 22. The lamp housing 22 is provided in its lower surface with an axially directed elongate slot 28 which receives the uppermost edge 30 of a transparent plastic sheet 32 which is supported by and depends downwardly from the lamp housing 22. In the illustrated embodiment, the transparent plastic sheet 32 is rectangular in shape, having two upright side edges 34,36 and a lowermost edge 38.

As is shown clearly in FIG. 3, the lowermost edge 38 is inclined to the plane of the sheet 32 with the internal face of the edge 38 facing towards the front face 40 and away from the rear face 42 of the sheet 32. The inclined edge 38 is preferably at an angle of less than about 45° to a line perpendicular to the sheet 32 so that light is reflected back from the edge 38 into the sheet 32 at a relatively low angle so as to subsequently be internally reflected back up through the sheet 32 with minimal loss of light intensity. In an alternative arrangement, the inclined edge 38 faces towards the rear face 42 rather than the front face 40. The front face 40 of the sheet 32 is coated with a front image layer 44 which is patterned in the shape of an image to be displayed by the sign 20 (in the illustrated embodiment, the letter A which is shown merely by way of example). The rear face 42 of the sheet 32 is coated with a correspondingly shaped rear image layer 46 which is disposed in registry with the front image layer 44. In the illustrated embodiment, the width of the rear image layer 46 (in the plane of the layer 46) is dimensionally larger than that of the front image layer 44 whereby the rear image layer 46 defines, in regions such as regions 48,50,52,54 illustrated in FIG. 3, a peripheral margin 56 surrounding and highlighting the image conveyed by the front image layer 44. The front image layer 44 has a rearwardly directed surface 58 which is reflective. Preferably, the front image layer 44 comprises a self-adhesive plastic (e.g. vinyl) film which has an underlying self-adhesive reflective surface 58. The plastic film may be fluorescent and translucent. The front image layer 44 or its reflective surface may be provided by a metallic and/or brightly colored (e.g. white) paint layer or by a metallised or brightly colored coating on or in the plastic film. The paint layer 44 may be fluorescent and at least partially translucent. The front surface 60 of such a front image layer 44 may have been provided with any suitable color, pattern or image, either by such a colour, pattern or image being present in the film or having been applied thereto. The front image layer 44 may alternatively comprise a printed film of any desired color or colors. The rear image layer 46 comprises a layer of fluorescent material of any desired color or combination of colors which preferably has been printed, for example by screen printing, onto the rear face 42 of the sheet 32. Preferably, the rear image layer 46 is partially transmissive for visible light. In an alternative embodiment, the rear image layer may comprise a self-adhesive plastic (e.g. vinyl) film which is preferably fluorescent and translucent. The front and rear image layers may incorporate phosphorescent materials.

A backing sheet 62 is mounted behind and parallel with the sheet 32. The backing sheet 62 has a front face 64 which is preferably spaced slightly from the rear face 42 of the sheet 32. The backing sheet 62 is preferably comprises a substantially opaque plastic sheet having a desired color and/or a fluorescent coating. The backing sheet 62 may have any desired image or pattern or the front face 64 or the rear face 66 thereof when the backing sheet 62 is translucent. Alternatively, the backing sheet 62 may comprise a transparent plastic sheet having a substantially opaque coating on the front face 64. The lamp housing 22 is configured to provide a mount 68 for the upper edge 70 of the backing sheet 62. A bottom mount 72 is provided along the respective adjacent bottom edges 38,74 of the transparent sheet 32 and the backing sheet 74. Preferably, the inner surface 76 of the bottom mount 72 which abuts the inclined bottom edge 38 of the transparent sheet 32 is reflective. As shown schematically in FIG. 3, clamping devices 78,80 may be provided for holding together the assembly of the transparent sheet 32 and the backing sheet 62.

The operation of the edge-illuminated sign 20 will now be described with reference to FIGS. 4 and 5.

In use, the fluorescent bulb 26 is illuminated and as shown in FIG. 4, light beams, such as light beam 82, which are not parallel to the plane of transparent sheet 32 are transmitted through the plane of the sheet 32 by internal reflection at alternatively the inner and outer faces 40,42 of the transparent sheet 32. It will be seen that since in the illustrated embodiment the only layers which are formed on the front and rear faces 40,42 of the transparent sheet 32 are the front and rear image layers 44,46, there is an enhanced degree of internal reflection of light being transmitted along the sheet 32, the light being internally reflected at the sheet/air interfaces. If additional layers were present intimately covering the sheet faces, then the degree of internal reflection would be reduced because light would be absorbed into these additional layers, thereby reducing correspondingly the level of illumination of the desired image. For this reason, the backing sheet 62 may be adjacent to, but not adhered or otherwise intimately connected, bonded or adhered to the transparent sheet because this would reduce the total amount of light internally reflected in the transparent sheet.

As shown in FIG. 5, any light beam 84 which is parallel to the plane of the transparent sheet 32 is transmitted down the entire length of the sheet 32 and subsequently reflected by internal reflection at the inclined face 38, or reflected by reflection at the reflecting face 76 of the lower mount 72, and the reflected beam 86 is transmitted back up the transparent sheet 32 and subsequently internally reflected at the inner and outer faces 40,42 of the transparent sheet 32. In this way, light from the bulb 26 is transmitted throughout the whole body of the transparent sheet 32.

Light beams which are not parallel to the plane of the transmitting sheet 32 are reflected to a significant extent at the reflective surface 58 of the front image layer 44. This reflected light (e.g. at arrow 88) is reflected to a significant extent back onto the fluorescent rear image layer 46. This provides an enhanced illumination of the fluorescent rear image layer 46 so that the edges of the rear image layer 46 which are not directly covered by (i.e. are at least partially exposed by) the front image layer 44 appear very bright to a viewer of the sign (e.g. at arrow 90). This brightness is enhanced by the fluorescent effect of the rear image layer 46 which strongly emits fluorescent radiation as a result of being illuminated by light from the bulb 26. The overall illumination effect to a viewer of the sign 20 is a strongly illuminated fluorescent annular border or highlight surrounding the image defined by the front image layer 44. This provides an illuminated outline at least partially around indicia defined by the front image layer.

The front image layer 44 may be substantially opaque or partially transmitting. If the front image layer 44 is partially transmitting, then as shown in FIG. 4 some light (e.g. at arrow 92) is reflected from the rear face 42 of the sheet 32 forwardly through the front image layer 44 whereby the image defined by the front image layer 44 is partially illuminated.

Figure 1:
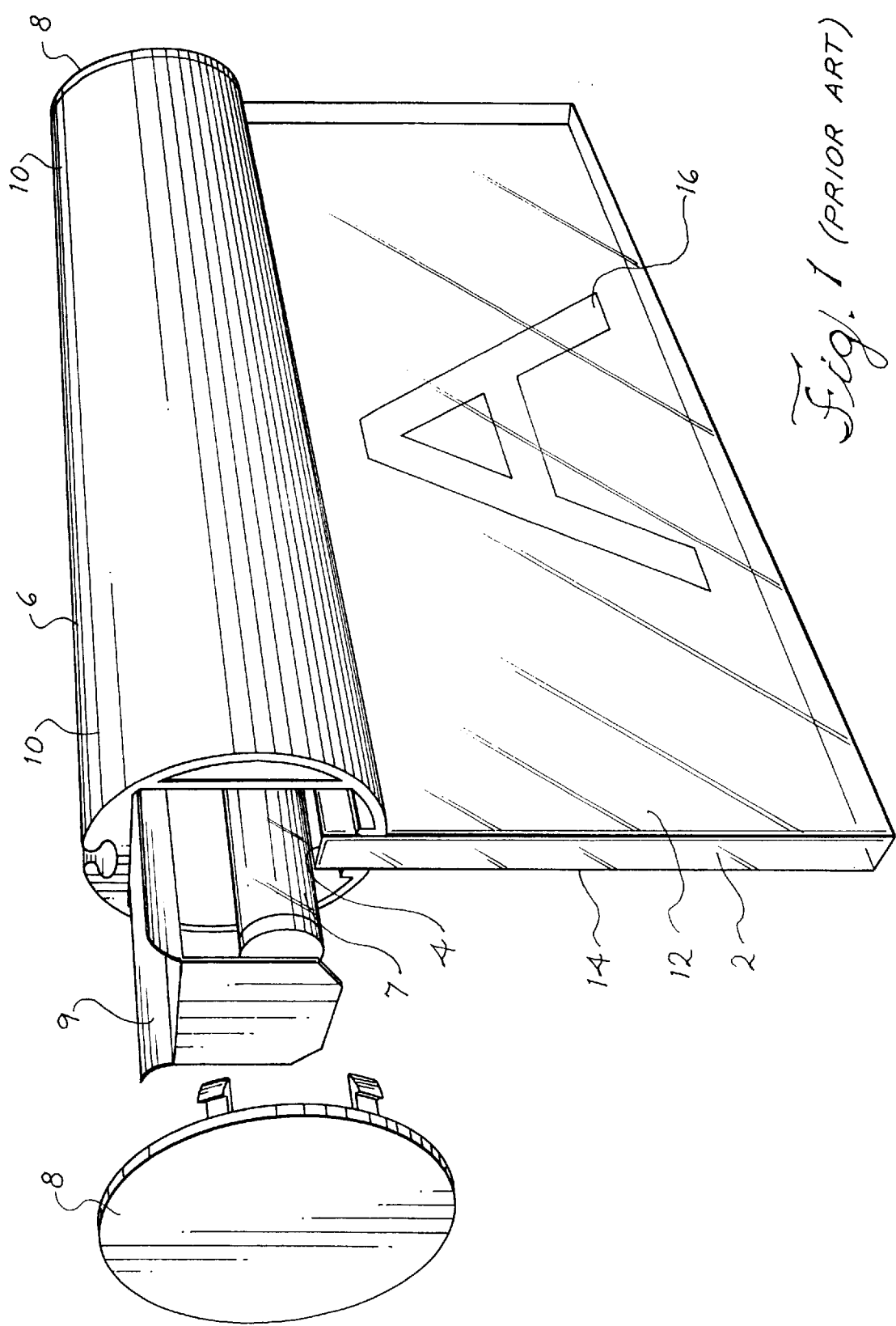
FIG. 1 is a partially exploded perspective view of a known edge-illuminated sign.

The fluorescent layer 46 is partially transmitting and accordingly light (e.g. at arrow 94) passes rearwardly through the fluorescent layer 46 and onto the backing sheet 62. Such light is reflected from the backing sheet 62 at its front face 64 (e.g. at arrow 94) and such reflected light is transmitted forwardly through the transparent sheet 32. Such reflected light from the backing sheet 62 provides an image of a halo or aura of light surrounding the image defined by light reflected from the fluorescent rear image layer 46. The halo of light is illustrated in FIG. 1. The color of the halo of light is preferably the same as that of the fluorescent rear image layer 46. The color may be varied by applying an additional colored layer to the back of the rear image layer or to the front of the backing sheet. The lateral width of the halo may be varied by altering the spacing between the transparent sheet 32 and the backing sheet 62.

A further embodiment of illuminated sign 90 in accordance with the present invention is illustrated in FIG. 6 which is similar to the embodiment illustrated in FIGS. 2 to 5 except that the opaque backing sheet 62 is replaced by a transparent backing sheet 96 having a reflecting coating 98 on its rear face 100. The reflecting coating 94 comprises a self-adhesive plastic film 102 having a reflecting front surface 104. Alternatively, the reflecting coating 94 is a printed layer. In a similar manner to that illustrated in and described with reference to FIGS. 4 and 5, a halo effect is provided around the fluorescent rear image layer 46 by light being reflected off the reflecting surface of the film 98 (e.g. at arrow 106). Since the reflecting film 102 is on the face 100 of the backing sheet 96 which is remote from the transparent sheet 32, there is no requirement for the backing sheet 96 to be spaced in order to provide a visible halo effect.

It will be apparent to those skilled in the art that various modifications can be made to the illustrated embodiments within the scope of the invention. In the illustrated embodiments, the front image layer lies wholly within the lateral periphery of the rear image layer so that a peripheral highlight is defined by a border portion of the rear image layer which surrounds the front image layer. In alternative embodiments, although the rear image layer would generally be in registry with the front image layer, the rear image layer may be laterally offset relative to the front image layer or may have smaller dimensions than the front image layer on one side thereof so as to provide a highlight which is offset and does not extend all the way around the periphery of the front image layer. Thus the highlight may appear as a highlighted "shadow" on one side of the image defined by the front image layer. In a further embodiment, the front and rear image layers may be aligned and have the same size and shape. With this embodiment a highlight or outline can be seen by a viewer looking at the sign at an angle.

In the embodiments of the invention, the front and rear image layers are separated by a distance corresponding to the thickness of the transparent sheet. When the front and rear image layers are illuminated in the manner described hereinabove, the viewer is able to detect a special difference between the front and rear image layers. This creates a three dimensional effect whereby the front and rear image layers appear to be connected by an inclined edge, giving the overall indicia a massive and solid appearance. The thickness of the three dimensional image corresponds to the thickness of the transparent sheet. The shape and angle of inclination of the inclined edge can be varied by altering the relative sizes and disposition of the front and rear image layers. For example, if the rear image layer is slightly larger in lateral dimension than the front image layer all around its periphery, then a relatively steep inclined edge will be apparent to a viewer of the sign when the sign is illuminated.

The images to be conveyed may comprise alphanumeric characters or other pictorial images. The front image layer may itself be printed or otherwise provided with images on its front surface.

Although the transparent sheet is illustrated as depending downwardly from the lamp housing 22, in alternative configurations the lamp housing may be provided beneath the transparent sheet and may constitute a support stand for the entire sign. In addition, although the illustrated embodiments utilise a fluorescent bulb as the light source for the illuminated sign, any other suitable light source may be employed, for example an incandescent bulb, a neon bulb, etc.

In alternative embodiments, a light reflective self-adhesive plastic layer, for example white or silver in colour, is adhered over the edge of the sheet which is remote from the light source in order to reflect light back through the sheet. The mount along that edge may be square rather than inclined, particularly for small dimension signs.

In accordance with the invention, the provision of a fluorescent layer at least partially surrounding the front image layer on the transparent sheet, together with the provision of a reflecting surface on the rear of that front image layer, provides real technical advantage as opposed to edge-illuminated signs in the prior art by forming an illuminated image having a relatively high intensity. This means that the edge-illuminated sign is clearly visible to a viewer even in relatively high intensity ambient light and when the sign is intended to be seen from a substantial distance away. The sign of the present invention also has great flexibility in use by enabling a wide variety of visual effects to be reproduced. For example different colours can be displayed with or without fluorescent layers. An aura of one or more colors may wholly or partially surround the indicia. The color, size, shape and orientation of a highlight around the indicia may be selected as desired. Printed or patterned images defining or surrounding the indicia may be provided. The sign can be manufactured very cost effectively by using known printing techniques and known techniques for applying patterned self-adhesive plastic films to rigid plastic sheets in the required positions.

The provision of a light reflection device at the edge of the sheet which is away from the light source ensures that the amount of light internally reflected in the sheet to cause illumination of the indicia is substantially maximised. This not only increases the visibility of the sign but also provides even and uniform illumination of the indicia on both sides thereof, i.e. on the sides which are near to and remote from the light source.

I claim:

1. An illuminated sign comprising:
   a light source generating light along a first direction,
   a transparent sheet comprising a front face, a rear face and an edge that connects said front face to said rear face, wherein said edge is positioned adjacent said light source for receiving said light generated along said first direction so that said light is transmitted within said transparent sheet along said first direction,
   a front image layer disposed on a front face of said transparent sheet, wherein said front image layer comprises a reflective surface that faces a second direction perpendicular to said first direction;
   a rear image layer disposed on a rear face of said transparent sheet substantially in registry with said front image layer, wherein said front image layer and said rear image layer are positioned so that said light within said transparent sheet is reflected from said reflective surface onto said rear image layer thereby to enhance illumination of said rear image layer; and
   wherein a portion of said light within said transparent sheet forms an image of a halo or aura of light surrounding said rear image layer.

2. An illuminated sign according to claim 1 wherein said front image layer comprises a self-adhesive plastic layer.

3. An illuminated sign according to claim 1 wherein said front image layer comprises a printed layer.

4. An illuminated sign according claim 1 wherein said front image layer is partially transmissive.

5. An illuminated sign according to claim 1 wherein said rear image layer comprises a fluorescent layer.

6. An illuminated sign according to claim 5 wherein said fluorescent layer comprises a self-adhesive plastic layer.

7. An illuminated sign according to claim 5 wherein said fluorescent layer comprises a printed layer.

8. An illuminated sign according to claim 1 wherein said front image layer and said rear image layer are mutually shaped and oriented whereby said front image layer at least partially overlaps said rear image layer.

9. An illuminated sign according to claim 8 wherein an annular peripheral portion of said rear image, layer surrounding said front image layer is exposed by said front image layer.

10. An illuminated sign according to claim 8 wherein said front image layer is laterally offset with respect to said rear image layer.

11. An illuminated sign according to claim 1 wherein said front and rear image layers are dimensioned and positioned with respect to each other so as to provide an illuminated outline at least partially around indicia defined by said first image layer.

12. An illuminated sign according to claim 1 further comprising a backing sheet located rearwardly of said rear face of said transparent sheet.

13. An illuminated sign according to claim 12 wherein said backing sheet is opaque.

14. An illuminated sign according to claim 12 wherein said backing sheet comprises a second transparent sheet carrying an opaque layer.

15. An illuminated sign according to claim 14 wherein said opaque layer is disposed on a rear face of said second transparent sheet.

16. An illuminated sign according to claim 12 wherein said front face of said backing sheet is spaced from said rear face of said transparent sheet.

17. An illuminated sign according to claim 16 wherein said backing sheet is parallel to said transparent sheet.

18. An illuminated sign according to claim 16 wherein there is an empty space between said front face of the backing sheet and said rear face of said transparent sheet.

19. An illuminated sign according to claim 18 wherein said backing sheet overlaps a substantial portion of said rear face of said transparent sheet.

20. An illuminated sign according to claim 19 wherein said backing sheet is parallel to said transparent sheet.

21. An illuminated sign according to claim 18 wherein said backing sheet is parallel to said transparent sheet.

22. An illuminated sign according to claim 16 wherein said backing sheet overlaps a substantial portion of said rear face of said transparent sheet.

23. An illuminated sign according to claim 12 wherein the rear image layer is partially transmissive whereby, in use, light transmitted therethrough onto said backing sheet creates an illuminated aura around said rear image layer.

24. An illuminated sign according to claim 1 wherein a second edge of said transparent sheet which is opposite said edge connecting said front face to said rear face to adapted to reflect light incident upon said second edge back into the transparent sheet.

25. An illuminated sign according to claim 24 wherein the second edge is inclined to a plane defined by said transparent sheet.

26. An illuminated sign according to claim 25 wherein said second edge is inclined at an angle of up to about to 45° to a line perpendicular to said plane defined by said transparent sheet.

27. An illuminated sign according to claim 24 further comprising a reflecting member which covers said second edge thereby to reflect light into said transparent sheet.

28. An illuminated sign according to claim 27 wherein said reflecting member comprises a mount for said transparent sheet and said backing sheet.

* * * * *

UNITED STATES PATENT AND TRADEMARK OFFICE
CERTIFICATE OF CORRECTION

PATENT NO. : 5,829,177
DATED : November 3, 1998
INVENTOR(S) : Thorgeir D. Hjaltason It is certified that error appears in the above-identified patent and that said Letters Patent is hereby corrected as shown below:

In the Claims

In claim 4, line 1, after "according" insert --to--.

In claim 9, line 2, delete "," (comma) immediately after "image".

In claim 24, line 3, delete "to adapted" and substitute --is adapted-- in its place.

In claim 26, line 2, delete "about to" and substitute --about-- in its place.

Signed and Sealed this

Twenty-ninth Day of May, 2001

Attest:

NICHOLAS P. GODICI

Attesting Officer     Acting Director of the United States Patent and Trademark Office